United States Patent [19]

Matthews et al.

[11] Patent Number: 5,763,780
[45] Date of Patent: Jun. 9, 1998

[54] VIBRATORY ROTATION SENSOR WITH MULTIPLEX ELECTRONICS

[75] Inventors: Anthony Matthews, Santa Barbara; J. Scott Darling, Goleta; Guy Thomas Varty, Woodland Hills, all of Calif.

[73] Assignee: Litton Systems, Inc., Woodland Hills, Calif.

[21] Appl. No.: 802,006

[22] Filed: Feb. 18, 1997

[51] Int. Cl.[6] .................................................. G01C 19/00
[52] U.S. Cl. ...................................... 73/504.13; 73/504.12
[58] Field of Search ............................. 73/504.13, 504.12, 73/504.02, 504.03, 504.04, 1.77

[56] References Cited

U.S. PATENT DOCUMENTS

| | | | |
|---|---|---|---|
| 3,924,475 | 12/1975 | Stiles | 73/504.13 |
| 4,793,195 | 12/1988 | Koning | 73/504.13 |
| 4,951,508 | 8/1990 | Loper, Jr. et al. | 73/504.13 |
| 5,434,467 | 7/1995 | Abe et al. | 73/504.12 |
| 5,471,875 | 12/1995 | Sato et al. | 73/504.13 |
| 5,587,529 | 12/1996 | Iguchi et al. | 73/504.13 |
| 5,616,864 | 4/1997 | Johnson et al. | 73/504.04 |
| 5,621,171 | 4/1997 | Fell | 73/504.13 |
| 5,644,082 | 7/1997 | Iwata et al. | 73/504.03 |

Primary Examiner—Hezron E. Williams
Assistant Examiner—Richard A. Moller
Attorney, Agent, or Firm—Robert E. Malm

[57] ABSTRACT

The invention is a vibratory rotation sensor comprising a resonator and a resonator housing and a method for controlling and reading out the sensor utilizing multiplex electronics. The resonator is a rotationally-symmetric thin-walled object that can be made to vibrate in a plurality of standing-wave modes. One or more electrodes are attached to a surface of the resonator and connect to a single output port. The housing has a plurality of attached electrodes in close proximity to the resonator electrodes. The method for controlling and reading out the vibratory rotation sensor includes applying driving voltages to the housing electrodes and determining the parameters of the standing waves by performing operations on the resonator signal that emerges from the resonator output port. A driving voltage may include either an excitation voltage or a forcing voltage or both. An excitation voltage has essentially no effect on the resonator dynamics but carries information pertaining to the standing-wave parameters when it arrives at the resonator output port. A forcing voltage causes forces to be applied to the resonator and thereby affects the dynamics of the resonator and the standing-wave parameters. The driving voltages applied to the housing electrodes are brought together into a single resonator signal as a result of being transmitted through the housing-electrode-resonator-electrode capacitances to the resonator output port. In order to extract the standing-wave parameters, the excitation and forcing voltages are designed to be separable by appropriate operations performed on the resonator signal.

39 Claims, 3 Drawing Sheets

1

VIBRATORY ROTATION SENSOR WITH MULTIPLEX ELECTRONICS

CROSS-REFERENCES TO RELATED APPLICATIONS

The subject matter of this invention is shared by the inventions disclosed in patent applications *Vibratory Rotation Sensor with AC Forcing and Sensing Electronics* by Kumar and Foster, *Vibratory Rotation Sensor with Whole-Angle Tracking* by Matthews, Varty, Li, and Lynch, (U.S. patent application Ser. No. 08/802,009) and *Vibratory Rotation Sensor with AC Forcing Voltages* by Lynch (U.S. patent application Ser. No. 08/802,007).

BACKGROUND OF THE INVENTION

This invention relates generally to vibratory rotation sensors and more specifically to the electronics associated with such rotation sensors.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to the interior metalized surface 30 of the hemispherical resonator 14.

Capacitive forces can be exerted on the hemispherical resonator 14 by means of appropriate forcing voltages between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodal points oscillate 90 degrees out of phase with the 90-degree and 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes.

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0-I_{90}+I_{180}-I_{270}$ where the subscripts identify the angular positions relative to the x axis of the electrodes from which the currents originate. Similarly, a y axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14 in order to reduce the magnitudes of the AC forcing voltages applied to the ring forcer electrode 20 and the discrete forcer electrodes 22 and to make the force exerted on the resonator a linear function of the AC driving voltage. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is a vibratory rotation sensor comprising a resonator and a housing which supports the resonator and a method for controlling and reading out such a sensor utilizing multiplex electronics. The resonator is a rotationally-symmetric thin-walled object that can be made to vibrate in a plurality of standing-wave modes. One or more electrodes are attached to a surface of the resonator and electrically connected to each other and to a single output port from which a resonator signal emerges. The housing has a plurality of attached electrodes in close proximity to the one or more resonator electrodes.

The method for controlling and reading out the vibratory rotation sensor includes the steps of generating a plurality of driving voltages, applying the driving voltages to the housing electrodes, and determining the parameters of the one or more standing waves by performing operations on the resonator signal appearing at the output port of the resonator.

The driving voltages applied to the housing electrodes are communicated to the resonator output port by means of the capacitances that exist between the housing electrodes and the resonator electrodes. A driving voltage may include either an excitation voltage or a forcing voltage or both. An excitation voltage has essentially no effect on the resonator dynamics but carries information pertaining to the standing-wave parameters when it arrives at the resonator output port. A forcing voltage causes forces to be applied to the resonator and thereby affects the dynamics of the resonator and the standing-wave parameters.

The driving voltages applied to the housing electrodes are brought together into a single resonator signal as a result of being transmitted through the housing-electrode-resonator-electrode capacitances to the resonator output port. In order to extract the standing-wave parameters, the excitation and forcing voltages are designed to be separable by appropriate operations performed on the resonator signal.

The excitation and forcing voltages can be structured in a variety of ways. A frequency-division multiplexing approach results in the excitation voltages being confined to separated frequency bands and the frequency spectrum of the forcing voltages being confined to a frequency band separated from the frequency bands associated with the excitation voltages.

A phase-division multiplexing approach results in the excitation voltages being periodic functions with the same frequency but with phases differing by a quarter of a cycle, the frequency spectrum of the forcing voltages being confined to a frequency band separated from the frequencies of the excitation voltages.

One time-division multiplexing approach results in the excitation voltages being proportional to unique square waves that take on the values 0 and 1 and each forcing voltage including a multiplicative factor proportional to a square wave that takes on the values 0 and 1 where only one of the square waves associated with the excitation and forcing voltages takes on the value 1 at any given time.

A second time-division multiplexing approach results in each excitation voltage being proportional to the product of a periodic function having a predetermined frequency and phase and a unique square wave that takes on the values 0 and 1 and each forcing voltage including a multiplicative factor proportional to a square wave that takes on the values 0 and 1, only one of the square waves associated with the excitation and forcing voltages taking on the value 1 at any given time.

A code-division multiplexing approach results in the excitation voltages being proportional to unique square waves which take on the values of −1 and 1 in accordance with predetermined pseudorandom sequences, the frequency spectrum of the forcing voltages being confined to a frequency band separated from the frequency band associated with the excitation voltages.

The process of extracting standing-wave parameters from the resonator signal consists of first extracting at least two components from the resonator signal and then determining the standing-wave parameters by performing operations on the two components. In the case of frequency-division multiplexing wherein the two components occupy separated frequency bands, each component is extracted by performing operations on the resonator signal that discriminate between the separated frequency bands.

In the case of phase-division multiplexing wherein the two components are periodic functions having the same frequency and phases that differ by one-quarter of a cycle, each component is extracted by performing operations on the resonator signal that discriminate between the phases of the two components.

In the case of time-division multiplexing wherein the two components are present in the resonator signal during different time periods, each component is extracted by performing operations on the resonator signal that discriminate between the different time periods.

In the case of code-division multiplexing wherein the two components are pseudorandom sequences of 0's and 1's and the cross correlation of the pseudorandom sequences is 0, each component is extracted by performing operations on the resonator signal that discriminate between the two pseudorandom sequences.

DESCRIPTION OF THE PREFERRED EMBODIMENTS

The invention is a vibratory rotation sensor for which the control and readout is accomplished with multiplexed voltages. The vibratory rotation sensor of the present invention consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 1:
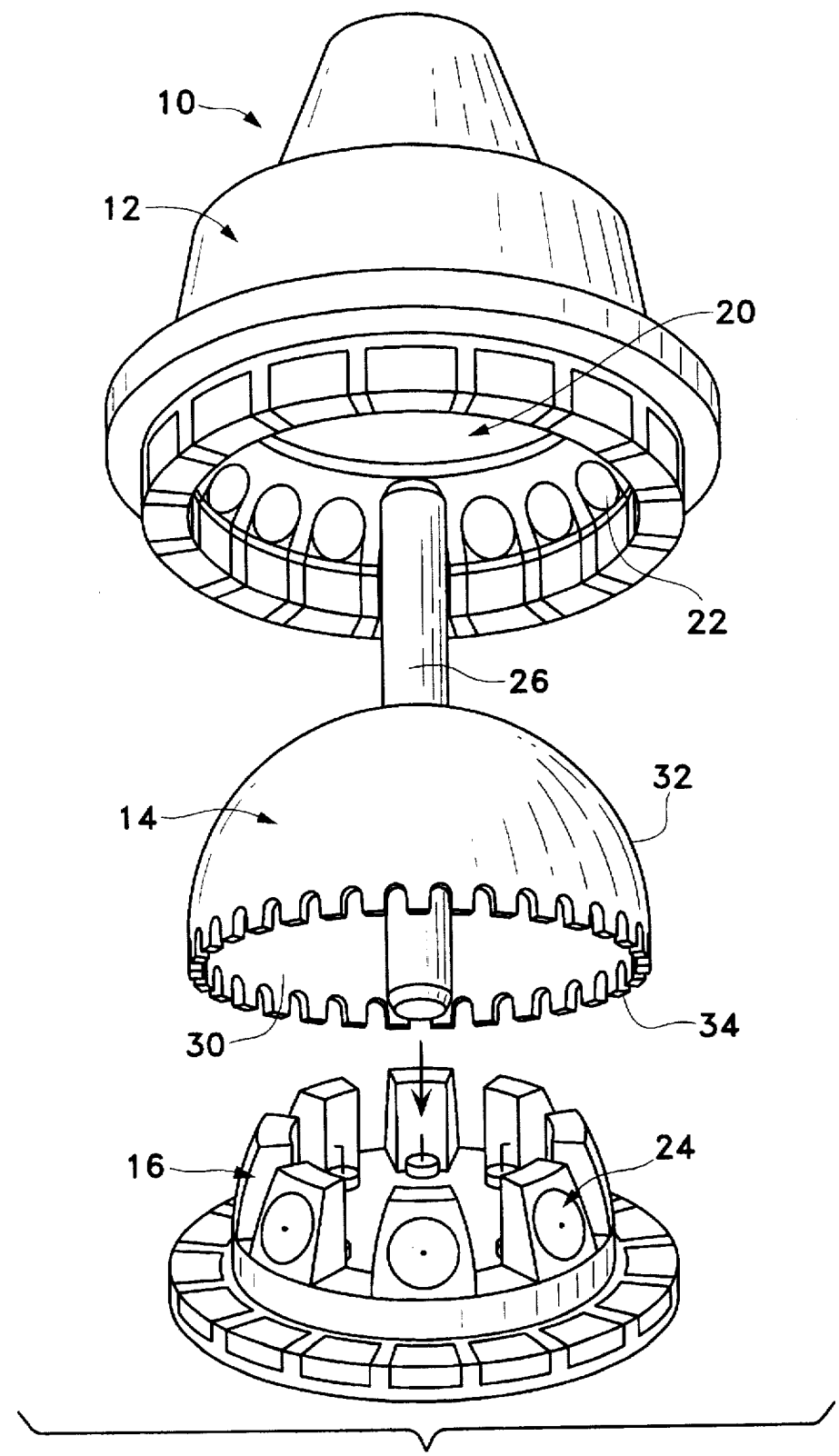
FIG. 1 shows the structure of a prior-art vibratory rotation sensor.
Figure 2:
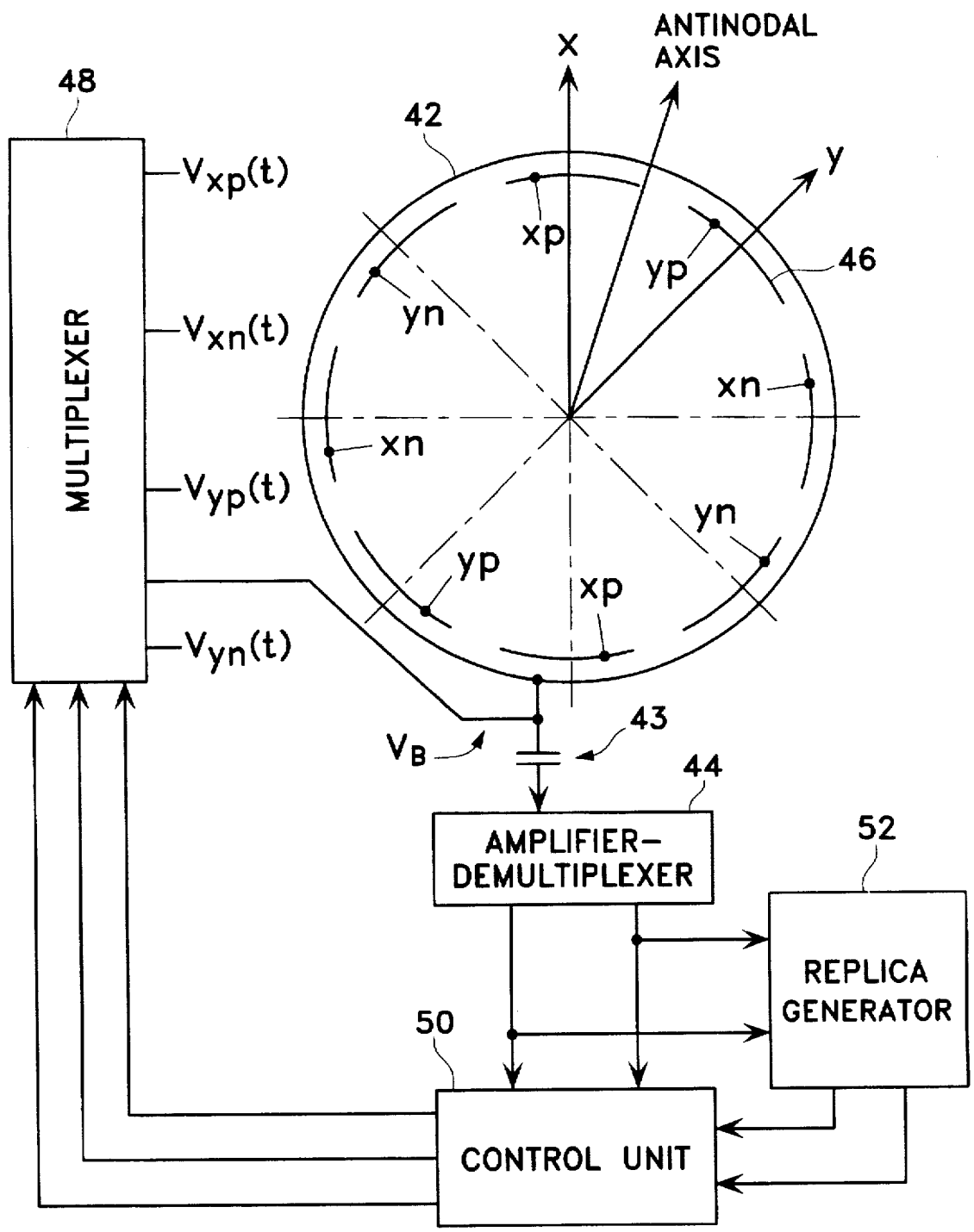
FIG. 2 shows a block diagram of the control and readout electronics for the invention.

A simplified method for determining the parameters of the standing waves and controlling the dynamics of the resonator is shown in FIG. 2. The standing waves are describable with respect to the x and y axes shown in the figure. The deviation of the resonator rim from a circle along the inphase antinodal axis shown in FIG. 2 for the inphase standing wave is assumed to vary as $\cos(\omega t+\phi)$ where $\omega$ is the vibration frequency. The angular position or position angle of the inphase antinodal axis is $\theta$ measured clockwise from the x axis. The deviation of the resonator rim from a circle along the quadrature antinodal axis for the quadrature standing wave, the quadrature antinodal axis being displaced 45 degrees clockwise from the inphase antinodal axis, is assumed to vary as $\sin(\omega t+\phi)$.

The circumferentially-continuous resonator electrode 42 deposited on the interior surface of the resonator is biased by square-wave voltage $V_B$ which is supplied by multiplexer 48. The sign of $V_B$ is reversed in sign periodically in order to avoid ion migration and large variations in the VRS scale factor when operating in the force-to-rebalance mode. To accomplish this purpose, the square-wave frequency should preferably be at least a few Hz. Certain design conveniences may arise if the square-wave frequency is made equal to the vibration frequency of the resonator. If the forcing voltages are not applied continuously, the magnitude of $V_B$ may be set equal to zero when the forcing voltages are absent.

The resonator electrode 42 connects through a DC-blocking capacitor 43 to the amplifier-demultiplexer 44. Eight electrodes 46 attached to the VRS housing are equally spaced about the circumference in close proximity to the resonator electrode 42, the uppermost xp electrode being centered on the x-axis. The eight electrodes 46 are supplied with the four driving voltages $V_{xp}(t)$, $V_{xn}(t)$, $V_{yp}(t)$, and $V_{yn}(t)$ from the multiplexer 48 where $$V_{xp}(t)=V_{mx}(t)\cos(\omega_x t+\psi_x)+V_{cx}(t)U_{xp}(t)$$

$$V_{xn}(t)=-V_{mx}(t)\cos(\omega_x t+\psi_x)+V_{cx}(t)U_{xn}(t)$$

$$V_{yp}(t)=V_{my}(t)\cos(\omega_y t+\psi_y)+V_{cy}(t)U_{yp}(t)$$

$$V_{yn}(t)=-V_{my}(t)\cos(\omega_y t+\psi_y)+V_{cy}(t)U_{yn}(t) \quad (1)$$

The preferred embodiments of the excitation voltages include the sinusoids $\cos(\omega_x t+\psi_x)$ and $\cos(\omega_y t+\psi_y)$. There are a variety of periodic functions $F(\omega_x t+\psi_x)$ which may be utilized instead of the sinusoids including ordinary square waves. The excitation voltages $V_{mx}(t)\cos(\omega_x t+\psi_x)$ and $V_{my}(t)\cos(\omega_y t+\psi_y)$ are designed not to affect the parameters of a standing wave on the resonator. The angular frequencies $\omega_x$ and $\omega_y$ and phases $\psi_x$ and $\psi_y$ depend on the type of multiplexing being used. The forcing voltages $V_{cx}(t)U_{xp}(t)$.

$V_{cx}(t)U_{xn}(t)$, $V_{cy}(t)U_{yp}(t)$, and $V_{cy}(t)U_{yn}(t)$ cause forces to be applied to the resonator for the purpose of controlling the parameters of the one or more standing waves on the resonator. The functions $U_{xp}(t)$, $U_{xn}(t)$, $U_{yp}(t)$, and $U_{yn}(t)$ are generated by control unit 50 and supplied to multiplexer 43. The voltages $V_{cx}(t)$ and $V_{cy}(t)$ are predetermined functions used to isolate the forcing voltages from the excitation voltages and are reversed in sign in synchronism with the sign reversal of $V_B$. The force exerted on the resonator 42 by $V_{cx}(t)U_{xp}(t)$, for example, is proportional to $[V_B-V_{cx}(t)U_{xp}(t)]^2$. Since $V_B$ and $V_{cx}(t)$ reverse signs in synchronism, the sign reversals have no effect on the force exerted on the resonator.

The current I(t) flowing from the resonator electrode 42 into the amplifier-demultiplexer 44 is given by $$I(t)=I_{xp}(t)+I_{xn}(t)+I_{yp}(t)+I_{yn}(t) \quad (2)$$

where $I_{xp}(t)=K_I V_{mx}(t)\omega_x \cos(\omega_x t+\psi_x)C_{xp}+K_I V_{cx}(t)\omega_{Uxp}U_{xp}(t)C_{xp}$ $I_{xn}(t)=-K_I V_{mx}(t)\omega_x \cos(\omega_x t+\psi_x)C_{xn}+K_I V_{cx}(t)\omega_{Uxn}U_{xn}(t)C_{xn}$ $I_{yp}(t)=K_I V_{my}(t)\omega_y \cos(\omega_y t+\psi_y)C_{yp}+K_I V_{cy}(t)\omega_{Uyp}U_{yp}(t)C_{yp}$ $I_{yn}(t)=-K_I V_{my}(t)\omega_y \cos(\omega_y t+\psi_y)C_{yn}+K_I V_{cy}(t)\omega_{Uyn}U_{yn}(t)C_{yn} \quad (3)$ The capacitances $C_{xp}$, $C_{xn}$, $C_{yp}$, and $C_{yn}$ are the capacitances of the xp, xn, yp, and yn electrodes 46 with respect to the resonator electrode 42. The angular frequencies $\omega_{Uxp}$, $\omega_{Uxn}$, $\omega_{Uyp}$, and $\omega_{Uyn}$ are those associated with the corresponding U's and are typically equal to or less than $2\omega$ where $\omega$ is the resonator vibration frequency. The symbol $K_I$ denotes a constant. The phase differences between the driving voltages and the resulting currents are if no relevance and have been ignored in the equations above. The capacitances are given by $C_{xp}=C_o[1+d_i \cos 2\theta \cos(\omega t+\phi)-d_q \sin 2\theta \sin(\omega t+\phi)]$ $C_{xn}=C_o[1-d_i \cos 2\theta \cos(\omega t+\phi)+d_q \sin 2\theta \sin(\omega t+\phi)]$ $C_{yp}=C_o[1+d_i \sin 2\theta \cos(\omega t+\phi)+d_q \cos 2\theta \sin(\omega t+\phi)]$ $C_{yn}=C_o[1-d_i \sin 2\theta \cos(\omega t+\phi)-d_q \cos 2\theta \sin(\omega t+\phi)] \quad (4)$ where $C_o$ is the capacitance of the electrode pairs when the resonator is not excited, $d_i$ and $d_q$ are the maximum flexing amplitudes respectively of the inphase and quadrature modes with reference to $\cos(\omega t+\phi)$ divided by the gap between the resonator electrode 42 and the electrodes 46 when the resonator is not excited, $\theta$ is the angle between the antinode of the inphase standing wave and the x-axis, $\omega$ is the angular frequency of vibration of the resonator, and $\phi$ is an arbitrary phase angle. Terms involving higher orders in $d_i$ and $d_q$ have been ignored in the above expressions.

Substituting the expressions for the capacitances in the current equations and summing to obtain I, we obtain $I(t) = K_I V_{mx}(t)\omega_x \cos(\omega_x t + \psi_x)C_o[2d_i \cos 2\theta \cos(\omega t + \phi) - \quad (5)$ $2d_q \sin 2\theta \sin(\omega t + \phi)] + K_I V_{cx}(t)\omega_{Uxp}U_{xp}(t)C_{xp} +$ $K_I V_{cx}(t)\omega_{Uxn}U_{xn}(t)C_{xn} + K_I V_{my}(t)\omega_y \cos(\omega_y t +$ $\psi_y)C_o[2d_i \sin 2\theta \cos(\omega t + \phi) + 2d_q \cos 2\theta \sin(\omega t + \phi)] +$ $K_I V_{cy}(t)\omega_{Uyp}U_{yp}(t)C_{yp} + K_I V_{cy}(t)\omega_{Uyn}U_{yn}(t)C_{yn}$ The current I(t) is transformed into the voltage V(t) by the amplifier-demultiplexer 44:

$V(t)=K_V[V_x(t)R_x(t)+V_y(t)R_y(t)]+K_F[F_x(t)+F_y(t)] \quad (6)$ where $K_V$ and $K_F$ are constants.

$V_x(t)=V_{mx}(t)\omega_x \cos(\omega_x t+\psi_x)$ $V_y(t)=V_{my}(t)\omega_y \cos(\omega_y t+\psi_y)$ $R_x(t)=d_i \cos 2\theta \cos(\omega t+\phi)-d_q \sin 2\theta \sin(\omega t+\phi)$ $R_y(t)=d_i \sin 2\theta \cos(\omega t+\phi)+d_q \cos 2\theta \sin(\omega t+\phi) \quad (7)$ and $F_x(t)=V_{cx}(t)[\omega_{Uxp}U_{xp}(t)C_{xp}+\omega_{Uxn}U_{xn}(t)C_{xn}]$ $F_y(t)=V_{cy}(t)[\omega_{Uyp}U_{yp}(t)C_{yp}+\omega_{Uyn}U_{yn}(t)C_{yn}] \quad (8)$ The signals $R_x(t)$ and $R_y(t)$ are the desired output from a demultiplexing process consisting of separate operations applied to V(t) since they contain the standing wave parameters $d_i$, $d_q$, $\theta$, $\omega$, and $\phi$.

Signals $S_x(t)$ and $S_y(t)$ containing the signals $R_x(t)$ and $R_y(t)$ are extracted by amplifier-demultiplexer 44 by performing the operations $O_x$ on $S_x(t)$ and the operations $O_y$ on $S_y(t)$. The operating principle of the demultiplexer portion of the amplifier-demultiplexer 44 depends on the form of the voltages $V_{mx}(t)$, $V_{my}(t)$, $V_{cx}(t)$, and $V_{cy}(t)$ and the values of $\omega_x$, $\omega_y$, $\psi_x$, and $\psi_y$.

For frequency-division multiplexing, $V_{mx}(t)$, $V_{my}(t)$, $V_{cx}(t)$, and $V_{cy}(t)$ are all equal to a constant, $\omega_x$, $\omega_y$, and $|\omega_x-\omega_y|$ are greater than about $6\omega$, and $\psi_x$ and $\psi_y$ are arbitrary constants. The signals $R_x(t)$ and $R_y(t)$ which contain the standing-wave parameters are obtained by performing two product demodulations of V(t), one with respect to $\cos(\omega_x t+\psi_x)$ and the other with respect to $\cos(\omega_y t+\psi_y)$. If a periodic function other than a sinusoid is being used, then the demodulations proceed using replicas of the periodic functions. A product demodulation consists of multiplying the input voltage by the reference sinusoid and lowpass filtering the product, the cutoff frequency of the lowpass filter being about $3\omega$. The results of the above process are the signals $S_{FDMx}(t)$ and $S_{FDMy}(t)$:

$S_{FDMx}(t)=K_{FDM}R_x(t)$ $S_{FDMy}(t)=K_{FDM}R_y(t) \quad (9)$ where $K_{FDM}$ is a constant. Because the upper limit to the frequency spectrums of $F_x(t)$ and $F_y(t)$ are about $3\omega$, these quantities are eliminated by the demultiplexing process.

For phase-division multiplexing, $\omega_x$ and $\omega_y$ have the same value $\omega_o$, $\omega_o$ being greater than about $6\omega$, and $\psi_x-\psi_y$ is equal to $\pi/2$ radians. The signals $S_{PDMx}(t)$ and $S_{PDMy}(t)$ are obtained by performing product demodulations of V(t) with respect to $\cos(\omega_o t+\psi_x)$ and with respect to $\cos(\omega_o t+\psi_y)$ (or with respect to replicas of the periodic functions being used).

$S_{PDMx}(t)=K_{PDM}R_x(t)$ $S_{PDMy}(t)=K_{PDM}R_y(t) \quad (10)$ where $K_{PDM}$ is a constant.

For one form of time-division multiplexing, $\omega_x$ and $\omega_y$ have the same value $\omega_o$ with $\omega_o$ being greater than about $6\omega$ and $\psi_x$ and $\psi_y$ are equal to an arbitrary number $\psi_o$. The voltages $V_{mx}(t)$ and $V_{my}(t)$ are proportional to square waves which take on values of 0 and 1, only one of which being equal to 1 at any given time and the duration of a "1" value being equal to an integer times $2\pi/\omega$. The voltages $V_{cx}(t)$, and $V_{cy}(t)$ are both equal to a constant. The signals $S_{TDMx}(t)$ and $S_{TDMy}(t)$ are obtained by performing a product demodulation of V(t) with respect to $\cos(\omega_o t+\psi_o)$ followed by parallel multiplications with $V_{mx}(t)$ and $V_{my}(t)$:

$$S_{TDMx}(t)=K_{TDM}V_{mx}(t)R_x(t)$$

$$S_{TDMy}(t)=K_{TDM}V_{my}(t)R_y(t) \quad (11)$$

where $K_{TDM}$ is a constant. It should be noted that $R_x(t)$ and $R_y(t)$ are available only when $V_{mx}(t)$ and $V_{my}(t)$ are non-zero.

The same results are obtained (except possibly for the value of the constant $K_{TDM}$) if $V_{mx}(t)$, $V_{my}(t)$, $V_{cx}(t)$, and $V_{cy}(t)$ are proportional to square waves which take on values of 0 and 1, only one of which being equal to 1 at any given time and the duration of a "1" value being equal to an integer times $2\pi/\omega$. This mode of operation may be desirable in that it completely isolates the forcing voltages $V_{cx}(t)U_{xp}(t)$, $V_{cx}(t)U_{xn}(t)$, $V_{cy}(t)U_{yp}(t)$, and $V_{cy}(t)U_{yn}(t)$ from each other and from the excitation voltages $V_{mx}(t) \cos(\omega_o t+\psi_o)$ and $V_{my}(t) \cos(\omega_o t+\psi_o)$.

For another form of time-division multiplexing, $\omega_o$ equals 0 and $V_{mx}(t)$, $V_{my}(t)$, $V_{cx}(t)$, and $V_{cy}(t)$ are proportional to square waves which take on values of 0 and 1, only one of which being equal to 1 at any given time and the duration of a "1" value being equal to an integer times $2\pi/\omega$. Multiplying $V(t)$ in parallel operations by $V_{mx}(t)$ and by $V_{my}(t)$ gives the same results as in the first form of time-division multiplexing.

For code-division multiplexing, $\omega_x$, $\omega_y$, $\psi_x$, and $\psi_y$ are all equal to 0. $V_{cx}(t)$, and $V_{cy}(t)$ are constants, and $V_{mx}(t)$ and $V_{my}(t)$ are proportional to square waves which take on pseudo-random sequences of values of $-1/T$ and $1/T$ and satisfy the following conditions:

$$\int_T V_i V_j dt = \begin{cases} 1; & i=j \\ 0; & i \neq j \end{cases} \quad (12)$$

where the subscripts i and j stand for any of the subscripts mx, my, cx, and cy. The integration time interval T should be less than $2\pi/3\omega$. The signals $S_{CDMx}(t)$ and $S_{CDMy}(t)$ are obtained by separately multiplying $V(t)$ by $V_{mx}(t)$ and $V_{my}(t)$ and then integrating over T:

$$S_{CDMx}(nT)=K_{CDM}R_x(nT)$$

$$S_{CDMy}(nT)=K_{CDM}R_y(nT) \quad (13)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_x(t)$ and $U_y(t)$ typically include three components:

$$U_{xp}(t)=U_{axp}(t)+U_{qxp}(t)+U_{rxp}(t)$$

$$U_{xn}(t)=U_{axn}(t)+U_{qxn}(t)+U_{rxn}(t)$$

$$U_{yp}(t)=U_{ayp}(t)+U_{qyp}(t)+U_{ryp}(t)$$

$$U_{yn}(t)=U_{ayn}(t)+U_{qyn}(t)+U_{ryn}(t) \quad (14)$$

where the subscripts a, q, and r identify the amplitude, quadrature and rate control voltages. It is not necessary to isolate these components from one another in all applications. However, if isolation is desired, the following substitutions can be made in the foregoing equations.

$$V_{cax}(t)U_{axp}(t)+V_{cqx}(t)U_{qxp}(t)+V_{crx}(t)U_{rxp}(t) \text{ for } V_{cx}(t)U_{xp}(t)$$

$$V_{cax}(t)U_{axn}(t)+V_{cqx}(t)U_{qxn}(t)+V_{crx}(t)U_{rxn}(t) \text{ for } V_{cx}(t)U_{xn}(t)$$

$$V_{cay}(t)U_{ayp}(t)+V_{cqy}(t)U_{qyp}(t)+V_{cry}(t)U_{ryp}(t) \text{ for } V_{cy}(t)U_{yp}(t)$$

$$V_{cay}(t)U_{ayn}(t)+V_{cqy}(t)U_{qyn}(t)+V_{cry}(t)U_{ryn}(t) \text{ for } V_{cy}(t)U_{yn}(t) \quad (15)$$

With these substitutions, any constraints imposed on $V_{cx}(t)$ and $V_{cy}(t)$ also apply to $V_{cax}(t)$, $V_{cqx}(t)$, $V_{crx}(t)$, $V_{cay}(t)$, $V_{cqy}(t)$, and $V_{cry}(t)$. For example, equations (1) become $$V_{xp}=V_{mx}(t) \cos(\omega_x t+\psi_x)+V_{cax}(t)U_{axp}(t)+V_{cqx}(t)U_{qxp}(t)+V_{crx}(t)U_{rxp}(t)$$

$$V_{xn}=-V_{mx}(t) \cos(\omega_x t+\psi_x)+V_{cax}(t)U_{axn}(t)+V_{cqx}(t)U_{qxn}(t)+V_{crx}(t)U_{rxn}(t)$$

$$V_{yp}=V_{my}(t) \cos(\omega_y t+\psi_y)+V_{cay}(t)U_{ayp}(t)+V_{cqy}(t)U_{qyp}(t)+V_{cry}(t)U_{ryp}(t)$$

$$V_{yn}=-V_{my}(t) \cos(\omega_y t+\psi_y)+V_{cay}(t)U_{ayn}(t)+V_{cqy}(t)U_{qyn}(t)+V_{cry}(t)U_{ryn}(t) \quad (16)$$

Figure 3:
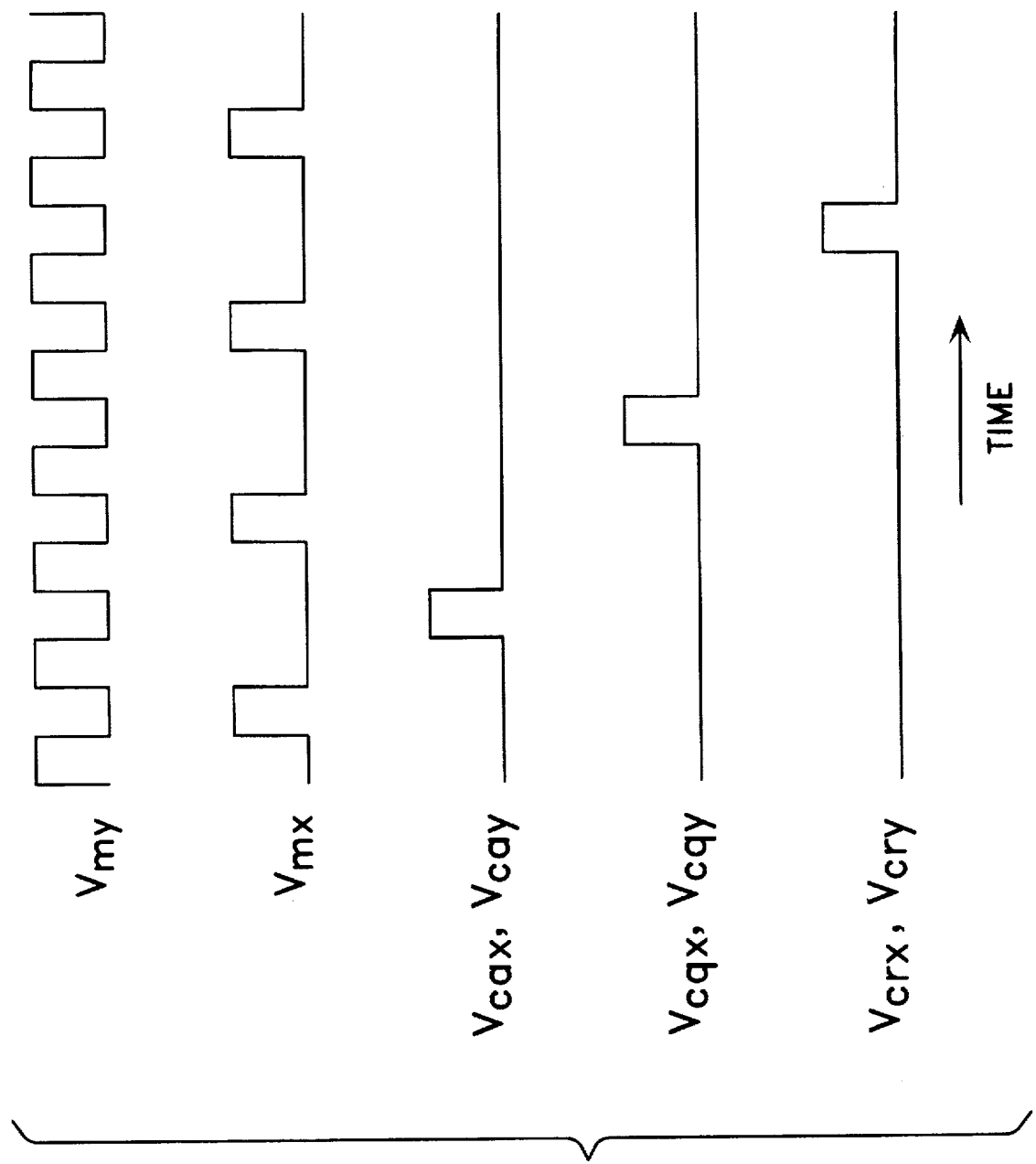
FIG. 3 shows the multiplex control signals for a particular embodiment of the invention.

One possible time-division-multiplex configuration is a sixteen-slot frame of duration $32\pi/\omega$ synchronized to the flexure rate of the resonator. The multiplex control voltages are as shown in FIG. 3. In the force-to-rebalance (FTR) mode of operation of the vibratory rotation sensor, the x axes are the antinodal axes and the y axes are the nodal axes. In the FTR mode, 8 slots are assigned to reading out the y signal component, 4 slots to reading out the x signal component, and 1 slot each to applying amplitude, quadrature, and rate forces to the resonator. For a vibration frequency of 4 kHz, readouts of the x and y signal components would be available at a rate of 2 kHz and 1 kHz respectively. The control voltages would be applied at a rate of 0.25 kHz.

In the whole-angle (WA) mode of operation, the rate force is not applied to the resonator and the slot assigned to the rate force is not used.

In general, the signals $S_x(t)$ and $S_y(t)$ exiting from the amplifier-demultiplexer 44 have the form $$S_x(t)=K_{Vx}R_x(t)$$

$$S_y(t)=K_{Vy}R_y(t) \quad (17)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

In order to extract the standing-wave parameters from the signals $S_x(t)$ and $S_y(t)$, a stable and precise replica of the resonator vibration signal $\cos(\omega t+\phi)$ is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signal $\cos(\omega_r t+\phi_r)$ and lowpass filter the results and then by the phase-shifted replica $\sin(\omega_r t+\phi_r)$ and lowpass filter the results. The results of this process are:

$$S_{ix}(t)=K\{d_i \cos 2\theta \cos[(\omega_r-\omega)t+(\phi_r-\phi)]+d_q \sin 2\theta \sin[(\omega_r-\omega)t+(\phi_r-\phi)]\}$$

$$S_{iy}(t)=K\{d_i \sin 2\theta \cos[(\omega_r-\omega)t+(\phi_r-\phi)]-d_q \cos 2\theta \sin[(\omega_r-\omega)t+(\phi_r-\phi)]\}$$

$$S_{qx}(t)=K\{d_i \cos 2\theta \sin[(\omega_r-\omega)t+(\phi_r-\phi)]-d_q \sin 2\theta \cos[(\omega_r-\omega)t+(\phi_r-\phi)]\}$$

$$S_{qy}(t)=K\{d_i \sin 2\theta \sin[(\omega_r-\omega)t+(\phi_r-\phi)]+d_q \cos 2\theta \cos[(\omega_r-\omega)t+(\phi_r-\phi)]\} \quad (18)$$

where K is a constant.

The next step is to form the following combinations of products of the $S_{ix}(t)$, $S_{iy}(t)$, $S_{qx}(t)$, and $S_{qy}(t)$:

$$E=S_{ix}^2+S_{qx}^2+S_{iy}^2+S_{qy}^2=K^2(d_i^2+d_q^2)$$

$$Q=2(S_{ix}S_{qy}-S_{iy}S_{qx})=K^2(2d_i d_q)$$

$$R=S_{ix}^2+S_{qx}^2-S_{iy}^2-S_{qy}^2=K^2(d_i^2-d_q^2)\cos 4\theta$$

$$S=2(S_{ix}S_{iy}+S_{qx}S_{qy})=K^2(d_i^2-d_q^2)\sin 4\theta$$

$$L_i=2(S_{ix}S_{qx}+S_{iy}S_{qy})=K^2(d_i^2-d_q^2)\sin[2(\omega_r-\omega)t+2(\phi_r-\phi)] \quad (19)$$

With $L_i(t)$ as the error signal, the phase-locked loop will lock up with the replica phase $\phi_r$ equal to $\phi$ and $\omega_r$ equal to $\omega$.

The standing-wave orientation angle can be determined from the equation $$\tan 4\theta = \frac{S(t)}{R(t)} \quad (20)$$

and the signs of $R(t)$ and $S(t)$. The quantity $S(t)$ can be used as the error signal in a control loop which forces $\theta$ to zero in a force-to-rebalance mode of operation.

The difference between $E(t)$ and a specified number is used as the error signal in the amplitude control loop which causes the total energy in the combined inphase and quadrature standing waves, which is proportional to $d_i^2+d_q^2$, to equal the specified number.

The quantity $Q(t)$ is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The outputs of the control unit 50 are the functions $U_{xp}(t)$, $U_{xn}(t)$, $U_{yp}(t)$, and $U_{yn}(t)$ which are supplied to multiplexer 48.

Additional details concerning vibratory rotation sensors are contained in U.S. Pat. No. 4,951,508 by Loper, Jr. et al. dated Aug. 28, 1990 which is incorporated by reference.

What is claimed is:

1. A vibratory rotation sensor comprising:
   a resonator, the resonator being a rotationally-symmetric thin-walled object, the resonator being capable of vibrating in at least one of a plurality of standing-wave modes, one or more resonator electrodes being attached to a surface of the resonator, the one or more resonator electrodes being electrically connected to a single output port;
   sensing electronics having an input port which is connected to the output port of the resonator, the sensing electronics determining from a resonator signal comprising a plurality of signals available at the output port of the resonator the parameters of the at least one standing wave existing when the resonator is vibrating.

2. The vibratory rotation sensor of claim 1 wherein a signal sum $V_x(t)R_x(t)+V_y(t)R_y(t)$ is among the plurality of signals present in the resonator signal, $V_x(t)$ and $V_y(t)$ being predetermined functions of time t and $R_x(t)$ and $R_y(t)$ being functions of time and the parameters of the at least one standing wave, the sensing electronics separately performing operations $O_x$ and $O_y$ on the resonator signal to obtain $R_x(t)$ and $R_y(t)$ respectively.

3. The vibratory rotation sensor of claim 2 wherein $O_x$ includes multiplying the resonator signal by a replica of a periodic function of angular frequency $\omega_x$ and phase $\psi_x$ followed by lowpass filtering and $O_y$ includes multiplying the resonator signal by a replica of a periodic function of angular frequency $\omega_y$ and phase $\psi_y$ followed by lowpass filtering, the values of $\omega_x$, $\psi_x$, $\omega_y$, and $\psi_y$ being predetermined.

4. The vibratory rotation sensor of claim 2 wherein $O_x$ includes multiplying the resonator signal by a replica of a periodic function of angular frequency $\omega_o$ and phase $\psi_o$ followed by lowpass filtering and $O_y$ includes multiplying the resonator signal by a replica of the periodic function of angular frequency $\omega_o$ and phase $(\psi_o+\pi/2)$ followed by lowpass filtering, the values of $\omega_o$ and $\psi_o$ being predetermined.

5. The vibratory rotation sensor of claim 2 wherein $O_x$ includes multiplying the resonator signal by $V_{mx}(t)$ and $O_y$ includes multiplying the resonator signal by $V_{my}(t)$ where $V_{mx}(t)$ and $V_{my}(t)$ are proportional to predetermined square-wave functions of time which take on values of 0 and 1, the square-wave functions not being equal to 1 at the same time.

6. The vibratory rotation sensor of claim 2 wherein (1) $O_x$ includes (a) multiplying the resonator signal by a replica of a periodic function followed by lowpass filtering and (b) multiplying by $V_{mx}(t)$ and (2) $O_y$ includes (a) multiplying the resonator signal by the replica of the periodic function followed by lowpass filtering and (b) multiplying by $V_{my}(t)$, the replica of the periodic signal having an angular frequency of $\omega_o$ and phase $\psi_o$, the values of $\omega_o$ and $\psi_o$ being predetermined, $V_{mx}(t)$ and $V_{my}(t)$ being proportional to predetermined square-wave functions of time which take on values of 0 and 1, the square-wave functions not being equal to 1 at the same time.

7. The vibratory rotation sensor of claim 2 wherein $O_x$ includes multiplying the resonator signal by $V_{mx}(t)$ followed by an integration over a predetermined time period T and $O_y$ includes multiplying the resonator signal by $V_{my}(t)$ followed by an integration over time period T where $V_{mx}(t)$ and $V_{my}(t)$ are proportional to square wave functions of time which take on sequences of values −1 and 1 during time period T.

8. The vibratory rotation sensor of claim 1 further comprising:
   a housing to which the resonator is attached, the housing having a plurality of attached housing electrodes in close proximity to the one or more resonator electrodes;
   driving electronics which supplies a voltage $V_{x1}(t)$ to a first group of one or more housing electrodes and a voltage $V_{y2}(t)$ to a second group of one or more housing electrodes, $V_{x1}(t)$ and $V_{y2}(t)$ including voltage components of $V_{mx}(t)F(\omega_x t+\psi_x)$ and $V_{my}(t)F(\omega_y t+\psi_y)$ respectively where $V_{mx}(t)$ and $V_{my}(t)$ are either predetermined functions of time t or constants and $F(\omega t+\psi)$ is a periodic function of time t with frequency $\omega$ and phase $\psi$, the values of $\omega_x$, $\psi_x$, $\omega_y$, and $\psi_y$ being predetermined.

9. The vibratory rotation sensor of claim 8 wherein $V_{mx}(t)$ and $V_{my}(t)$ are constants and $\omega_x$, $\omega_y$, and $|\omega_x-\omega_y|$ are greater than about $6\omega$, $\omega$ being the angular frequency of vibration of the resonator.

10. The vibratory rotation sensor of claim 8 wherein $V_{mx}(t)$ and $V_{my}(t)$ are constants, $\omega_x$ and $\omega_y$ are equal to a predetermined value $\omega_o$, and $\psi_x-\psi_y$ is equal to $\pi/2$ radians, $\omega_o$ being greater than about $6\omega$, $\omega$ being the angular frequency of vibration of the resonator.

11. The vibratory rotation sensor of claim 8 wherein $\omega_x$, $\omega_y$, $\psi_x$, and $\psi_y$ are equal to 0 and $V_{mx}(t)$ and $V_{my}(t)$ are proportional to first and second square-wave functions of time respectively which take on values of 0 and 1, the first and second square-wave functions not being equal to 1 at the same time.

12. The vibratory rotation sensor of claim 8 wherein $\omega_x$ and $\omega_y$ are equal to a predetermined value $\omega_o$, $\psi_x$ and $\psi_y$ are equal to a predetermined value $\psi_o$, and $V_{mx}(t)$ and $V_{my}(t)$ are proportional to first and second square-wave functions respectively which take on values of 0 and 1, $\omega_o$ being greater than about $6\omega$ where $\omega$ is the angular frequency of vibration of the resonator, the first and second square-wave functions not being equal to 1 at the same time.

13. The vibratory rotation sensor of claim 8 wherein $\omega_x$, $\omega_y$, $\psi_x$, and $\psi_y$ are equal to 0 and $V_{mx}(t)$ and $V_{my}(t)$ are proportional to first and second square-wave functions respectively which take on pseudorandom sequences of values of −1 and 1 during a predetermined time period.

14. The vibratory rotation sensor of claim 8 wherein $V_{x1}(t)$ and $V_{y2}(t)$ also includes voltage components $V_{cx}(t)U_{x1}(t)$ and $V_{cy}(t)U_{y2}(t)$ respectively, the quantities $V_{cx}(t)$ and $V_{cy}(t)$ being either functions of time t or constants, the voltage components $V_{cx}(t)U_{x1}(t)$ and $V_{cy}(t)U_{y2}(t)$ resulting in forces being applied to the resonator.

15. The vibratory rotation sensor of claim 14 wherein $V_{mx}(t)$, $V_{my}(t)$, $V_{cx}(t)$, and $V_{cy}(t)$ are constants and $\omega_x$, $\omega_y$, and $|\omega_x - \omega_y|$ are greater than about $6\omega$, $\omega$ being the angular frequency of vibration of the resonator.

16. The vibratory rotation sensor of claim 14 wherein $V_{mx}(t)$, $V_{my}(t)$, $V_{cx}(t)$, and $V_{cy}(t)$ are constants, $\omega_x$ and $\omega_y$ are equal to a predetermined number $\omega_o$, and $\psi_x - \psi_y$ is equal to $\pi/2$ radians, $\omega_o$ being greater than about $6\omega$, $\omega$ being the angular frequency of vibration of the resonator.

17. The vibratory rotation sensor of claim 14 wherein $\omega_x$, $\omega_y$, $\psi_x$, and $\psi_y$ are equal to 0 and $V_{mx}(t)$, $V_{my}(t)$, $V_{cx}(t)$, and $V_{cy}(t)$ are proportional to first, second, third, and fourth square-wave functions of time respectively which take on values of 0 and 1, the first, second, third, and fourth square-wave functions not being equal to 1 at the same time.

18. The vibratory rotation sensor of claim 14 wherein $\omega_x$ and $\omega_y$ are equal to a predetermined value $\omega_o$, $\psi_x$ and $\psi_y$ are equal to a predetermined value $\psi_o$, and $V_{mx}(t)$, $V_{my}(t)$, $V_{cx}(t)$, and $V_{cy}(t)$ are proportional to first, second, third, and fourth square-wave functions of time respectively which take on values of 0 and 1, $\omega_o$ being greater than about $6\omega$ where $\omega$ is the angular frequency of vibration of the resonator, the first, second, third, and fourth square-wave functions not being equal to 1 at the same time.

19. The vibratory rotation sensor of claim 14 wherein $V_{x1}(t)$ also includes voltage components $V_{cax}(t)U_{ax1}(t)$, $V_{cqx}(t)U_{qx1}(t)$, and $V_{crx}(t)U_{rx1}(t)$ and $V_{y2}(t)$ also includes voltage components $V_{cay}(t)U_{ay2}(t)$, $V_{cqy}(t)U_{qy2}(t)$, and $V_{cry}(t)U_{ry2}(t)$, $\omega_x$, $\omega_y$, $\psi_x$, and $\psi_y$ being equal to 0, $V_{mx}(t)$, $V_{my}(t)$, $V_{cax}(t)$, $V_{cqx}(t)$, $V_{crx}(t)$, $V_{cay}(t)$, $V_{cqy}(t)$, and $V_{cry}(t)$ being proportional to first, second, third, fourth, fifth, sixth, seventh, and eighth square-wave functions of time respectively which take on values of 0 and 1, the first, second, third, fourth, fifth, sixth, seventh, and eighth square-wave functions not being equal to 1 at the same time.

20. The vibratory rotation sensor of claim 14 wherein $V_{x1}(t)$ also includes voltage components $V_{cax}(t)U_{ax1}(t)$, $V_{cqx}(t)U_{qx1}(t)$, and $V_{crx}(t)U_{rx1}(t)$ and $V_{y2}(t)$ also includes voltage components $V_{cay}(t)U_{ay2}(t)$, $V_{cqy}(t)U_{qy2}(t)$, and $V_{cry}(t)U_{ry2}(t)$, $\omega_x$ and $\omega_y$ being equal to a predetermined value $\omega_o$, $\psi_x$ and $\psi_y$ being equal to a predetermined value $\psi_o$, $\omega_o$ being greater than about $6\omega$ where $\omega$ is the angular frequency of vibration of the resonator, $V_{mx}(t)$, $V_{my}(t)$, $V_{cax}(t)$, $V_{cqx}(t)$, $V_{crx}(t)$, $V_{cay}(t)$, $V_{cqy}(t)$, and $V_{cry}(t)$ being proportional to first, second, third, fourth, fifth, sixth, seventh, and eighth square-wave functions of time respectively which take on values of 0 and 1, the first, second, third, fourth, fifth, sixth, seventh, and eighth square-wave functions not being equal to 1 at the same time.

21. The vibratory rotation sensor of claim 14 wherein $\omega_x$, $\omega_y$, $\psi_x$, and $\psi_y$ are equal to 0 and $V_{mx}(t)$ and $V_{my}(t)$ are proportional to first and second square-wave functions of time respectively which take on pseudorandom sequences of values of −1 and 1, $V_{cx}(t)$ and $V_{cy}(t)$ being constants.

22. The vibratory rotation sensor of claim 1 further comprising:
a housing to which the resonator is attached, the one or more resonator electrodes being biased with a constant-magnitude voltage that reverses sign periodically, the electric potential of the resonator and housing corresponding to zero volts.

23. A method for controlling and reading out a vibratory rotation sensor comprising a resonator having one or more resonator electrodes connected to a single output port and a housing having a plurality of housing electrodes in close proximity to the one or more resonator electrodes, the resonator being capable of vibrating in one or more standing-wave modes, each standing wave mode being defined by a plurality of parameters, the method comprising the steps:

(a) generating a plurality of driving voltages;

(b) applying the driving voltages to the housing electrodes;

(c) determining the parameters of at least one of the one or more standing waves by performing operations on a resonator signal appearing at the output port of the resonator.

24. The method of claim 23 wherein each driving voltage includes an excitation voltage, the frequency spectrums of at least two of the excitation voltages being confined to separated frequency bands.

25. The method of claim 23 wherein the number of different driving voltages is two, each driving voltage including an excitation voltage, each excitation voltage being a periodic function, the frequencies of the two different excitation voltages being the same, the phases differing by a quarter of a cycle.

26. The method of claim 23 wherein each driving voltage includes an excitation voltage, each of at least two excitation voltages being proportional to a unique square wave that takes on the values 0 and 1, only one of the square waves taking on the value 1 at any given time.

27. The method of claim 23 wherein each driving voltage includes an excitation voltage, each of at least two excitation voltages being proportional to the product of a periodic function having a predetermined frequency and phase and a unique square wave that takes on the values 0 and 1, only one of the square waves taking on the value 1 at any given time.

28. The method of claim 23 wherein each driving voltage includes an excitation voltage, each of at least two excitation voltages being proportional to a unique square wave which takes on the values of −1 and 1 in accordance with a predetermined pseudorandom sequence.

29. The method of claim 23 wherein each of at least two driving voltages includes an excitation voltage and a forcing voltage, the frequency spectrums of the excitation voltages being confined to separated frequency bands, the frequency spectrum of the forcing voltages being confined to a frequency band separated from the frequency bands associated with the excitation voltages.

30. The method of claim 23 wherein the number of different driving voltages is two, each driving voltage including an excitation voltage and a forcing voltage, each excitation voltage being a periodic function, the frequencies of the two different excitation voltages being the same, the phases differing by a quarter of a cycle, the frequency spectrum of the forcing voltages being confined to a frequency band separated from the frequency of the excitation voltages.

31. The method of claim 23 wherein each of at least two of the plurality of driving driving voltages includes an excitation voltage and a forcing voltage, each excitation voltage being proportional to a unique square wave which takes on the values of −1 and 1 in accordance with a predetermined pseudorandom sequence, the frequency spectrum of the forcing voltages being confined to a frequency band separated from the frequency band associated with the excitation voltages.

32. The method of claim 23 wherein each of at least two driving voltages includes an excitation voltage and a forcing voltage, each excitation voltage being proportional to the product of a periodic function having a predetermined frequency and phase and a unique square wave that takes on the values 0 and 1, each forcing voltage including a multiplicative factor proportional to a square wave that takes on the values 0 and 1, only one of the square waves associated with the excitation and forcing voltages taking on the value 1 at any given time.

33. The method of claim 23 wherein each of at least two driving voltages includes an excitation voltage and a forcing voltage, each excitation voltage being proportional to a unique square wave which takes on the values of −1 and 1 in accordance with a predetermined pseudorandom sequence, the frequency spectrum of the forcing voltages being confined to a frequency band separated from the frequency band associated with the excitation voltages.

34. The method of claim 23 wherein the resonator signal is the sum of two components that are functions of the standing-wave parameters, step (c) comprising the steps:

(c1) extracting each of the two components from the resonator signal;

(c2) determining the standing-wave parameters by performing operations on the two components.

35. The method of claim 34 wherein the two components occupy separated frequency bands, each component being extracted by performing operations on the resonator signal that discriminate between the separated frequency bands.

36. The method of claim 34 wherein the two components are periodic functions having the same frequency and phases that differ by one-quarter of a cycle, each component being extracted by performing operations on the resonator signal that discriminate between the phases of the two components.

37. The method of claim 34 wherein the two components are present in the resonator signal during different time periods, each component being extracted by performing operations on the resonator signal that discriminate between the different time periods.

38. The method of claim 34 wherein the two components are pseudorandom sequences of 0's and 1's, the cross correlation of the two pseudorandom sequences being equal to 0, each component being extracted by performing operations on the resonator signal that discriminate between the two pseudorandom sequences.

39. The method of claim 23 further comprising the step:

(d) biasing the resonator electrode with a constant-magnitude voltage that reverses sign periodically, the electric potential of the resonator and housing corresponding to zero volts.

* * * * *